UNITED STATES PATENT OFFICE 2,147,162

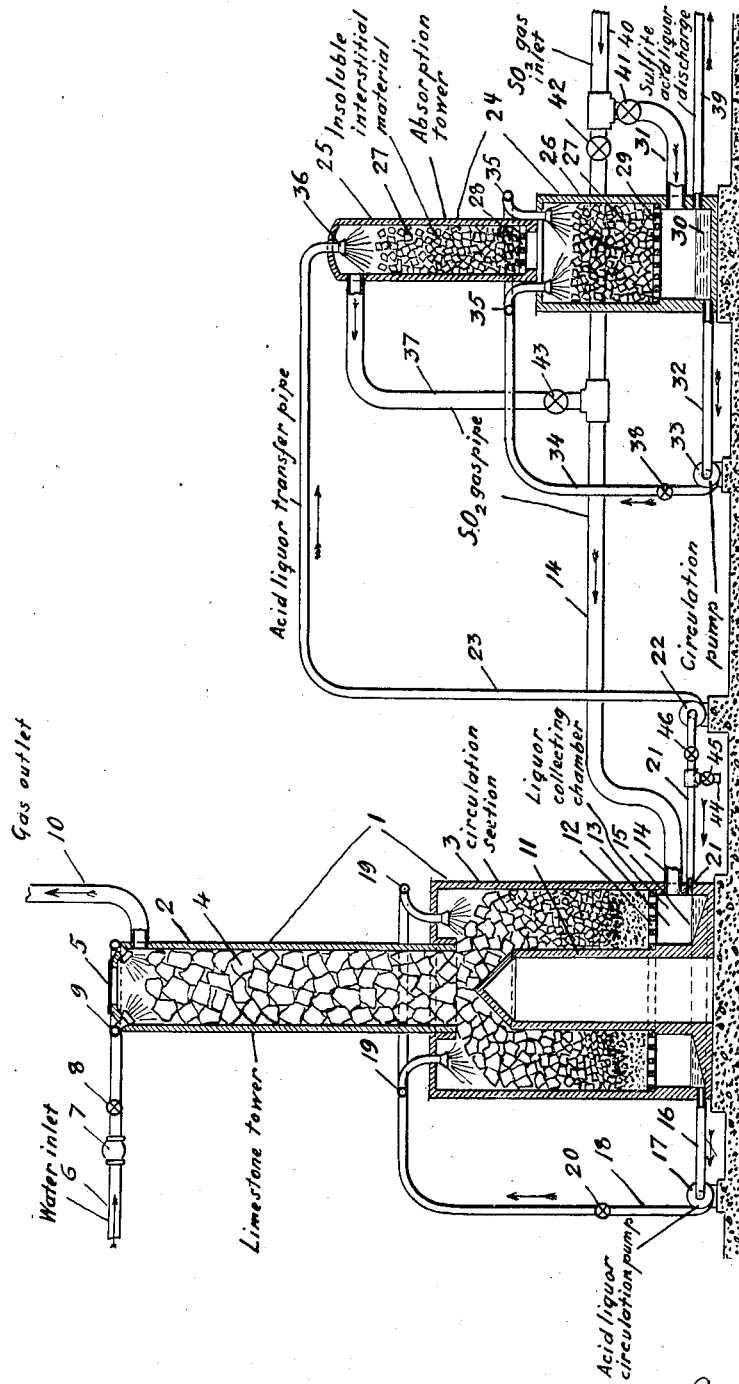

PROCESS FOR THE PRODUCTION OF BISULPHITE SOLUTIONS

Gustaf Haglund, Storangen at Stockholm, Sweden

Original application February 24, 1937, Serial No. 127,379. Divided and this application September 21, 1937, Serial No. 164,861. In Germany March 3, 1936

3 Claims. (Cl. 23—132)

This invention relates to the production of bisulphite solutions, and more particularly to a process for the production of calcium bisulphite solutions of the kind used in the production of sulphite cellulose or pulp. The object of the invention is to provide an improved process for the production of such solutions from a lime-bearing material in lump form. The present application is divided out from applicant's co-pending application Serial No. 127,329, filed February 24, 1937, in which a suitable apparatus for carrying out such a process is claimed.

In present practice the processes for the production of calcium bisulphite liquor (raw acid) where limestone in lump form is used are generally carried out in a plant consisting of two towers filled with the limestone and connected with each other to form a system wherein sulphur dioxide gas is passed upwards through the towers in series counter-current to water supplied to the system and the acid formed in the towers. In the reactions taking place on the formation of the acid the limestone is consumed in a different degree in the two towers. The strongest consumption of limestone takes place in the tower where the fresh $SO_2$ gas is introduced into the tower system and where the strongest acid is obtained ("strong acid tower"), and in order to obtain a uniform consumption of limestone in both towers the order of the towers in the system is changed at intervals. In any case, the weak acid formed in the first tower for the moment serving as "weak acid tower" is transferred from the bottom of said tower to the top of the "strong acid tower" and trickled down through the latter from the bottom of which the resulting liquor is then discharged.

The above-mentioned process, however, has several objectionable features. So, for instance, even under normal working conditions it is practically impossible to produce continually a raw acid of constant composition especially on account of the influence of the temperature on the speed of reaction. Consequently, in winter time the composition of the acid obtained is different from that obtained in summer time. Further, such plants are generally built for the production of a certain quantity of raw acid of a substantially definite composition and a change in the quantity produced will also result in a change in the composition of the acid. For the same reason, a regulation of the composition of the acid cannot be effected while maintaining the quantity unaltered. Generally speaking, there is little or no possibility of compensating in another direction a change occurring in one respect, nor, consequently, of regulating the working in said process.

It is further also proposed, in connection with such a two tower system, to use a supplemental limestone tower through which the liquor obtained from said tower system may be circulated. Hereby the content of lime in the liquor may be increased, when necessary, but also in this case there is no possibility of effecting a satisfactory regulation in different directions.

The object of the present invention is now to provide a process whereby it is rendered possible to avoid the above-mentioned disadvantages and to obviate the difficulties connected with the production of sulphite acid liquor when using limestone in lump form, so that—independent of the conditions prevailing—a liquor of predetermined composition can be obtained.

Another object of this invention is to provide such a process by means of which the manufacture of such sulphite acid liquor can be carried out in a cheap and simple manner and with the use of an apparatus of a cheap and simple construction and of comparatively small dimensions.

A still further object of the invention is to provide measures whereby the difficulties caused by the so-called "hanging" in the limestone mass are removed.

The main and principal feature of the new process according to the invention consists in the circulation through the lower portion of a confined mass of lime-bearing material in lump form fed downwardly of the solution resulting from the action of $SO_2$ gas and water upon said limestone, said agents being passed in counter-current relationship through the lime-stone mass. This circulation is an integrant part of the process and by increasing or reducing the quantity and rate of circulation in relation to the different working conditions the composition of the liquor can always be regulated as desired.

Thus, for instance, if under certain working conditions including the circulation of a certain quantity of solution per time unit a liquor of a certain composition is obtained and it is desired to produce a liquor having a lower content of lime it is only necessary to reduce the quantity of circulation correspondingly, the other working conditions being kept constant. By suitably regulating the circulation in relation to the quantity and composition of the $SO_2$ gases as well as the water supplied the content of lime in the liquor can be adjusted to correspond to a predetermined value and at the same time a complete absorption of the sulphur dioxide may be compassed.

Generally speaking, in the present process a change of any of the factors having an influence upon the production of the acid may easily be equalized or compensated by changing the quantity or rate of circulation in the lower reaction zone.

This process can be carried out in a single limestone tower of comparatively small dimensions but nevertheless great capacity.

In order to ensure a satisfactory distribution of the circulating liquor over the limestone in said lower portion of the limestone mass it is preferred to cause the descending mass to deflect laterally in such a way that the circulated liquor can be spread from above over the limestones in said lower portion thereof.

Further in a preferred manner of working a higher rate of sinking of the descending lime-bearing material is maintained in the upper portion of the reaction zone (where the consumption of said material is comparatively low) than in the lower portion thereof (where the circulation of the liquor takes place), so as to prevent a "hanging" of the limestone in the first-mentioned portion of the reaction zone.

In such cases where a raw acid of definite, preferably high content of totally free $SO_2$ is desired, the raw acid produced as described and having a definite content of lime is enriched in totally free $SO_2$. This may be effected in different ways, for instance, as known per se, by passing said raw acid through a mass of insoluble interstitial material in countercurrent flow to sulphur dioxide gases passing therethrough.

In the preferred manner of working according to the invention, however, the resulting liquor is then collected from the bottom of the mass of interstitial material and circulated through the lower portion thereof in a way similar to that described above in connection with the mass of lime-bearing material. In this process the extent of circulation may be regulated to ensure a desired, predetermined content of free $SO_2$ in the liquor.

In this manner it is possible to accommodate exactly the composition of the acid to different conditions of digestion and to regulate the same with regard to the quality of the pulp to be produced.

The process according to the invention is described below in greater detail in connection with the accompanying drawing which shows one form of apparatus with which said process may be carried out.

In the drawing 1 designates a limestone tower comprising an upper section 2 and a lower section 3, and 4 is the filling of limestone in lumps in the tower. At the top the tower has an opening provided with a cover or lid 5 for introduction of the limestones into the tower. Further, there is arranged a water supply pipe 6, a water-meter 7, a valve 8, a trickling device or sprinkler 9, and a gas exhaust pipe 10.

The two sections of the tower may be of a cylindrical form. In the form of apparatus shown in the drawing said sections are arranged concentrically in relation to each other, and the diameter of the lower section is considerably greater than that of the upper section. In the lower section there is in the centre built a middle part 11 which serves to deflect laterally the limestone filling sinking downwards from the upper section of the tower on its passage into the lower section and to spread out and distribute it in such a way that there will be a free space between the limestone filling and the upper wall of the lower section of the tower. The limestone filling in the tower is supported by a grating 12 in the tower section 3. In the free space 13 under said grating 12 opens the supply pipe for the $SO_2$-gas. The lower part of this space 13 serves as a collecting chamber 15 for the liquid passing through the tower or the bisulphite solution (acid) which has been formed. By means of the pipes 16 and 18 connected by the pump 17 said chamber is connected with the free space above the limestone filling in the upper part of the section 3 where trickling devices or sprinklers 17 are arranged in a sufficient number and suitably disposed. The pump 17 is preferably so dimensioned that it can transfer a quantity of liquid, which is several times as great as the quantity supplied by the pipe 6. For the discharge of the raw acid formed from the acid chamber 15 there is arranged an overflow pipe 21 with the branch pipe 44.

In case the acid produced in the limestone tower 1 in conformity with the above is to be enriched in its content of free $SO_2$, said acid may be transferred through the pipe 21 to a second tower 24 by means of the pump 22 and the pipe 23 which ends in a sprinkler 36. The tower 24 which generally can be considerably smaller than the tower just described comprises like the latter an upper section 25 and a lower section 26 of a greater diameter. In the form of apparatus shown in the drawing the sections 25 and 26 are both provided with a filling 27 of an interstitial material such as rings, coke, pumice stones or the like of an insoluble material which are supported by gratings 28 and 29 arranged in the lower part of said tower sections 25 and 26. A middle part like the part 11 in the tower 1 is here superfluous. Under the grating 29 there is a free space serving as a collecting chamber 30 for the acid which has been produced. Into said chamber also a gas supply pipe 31 opens which branches off from the main gas supply pipe 40. Said main gas pipe 40 is also connected with the gas supply pipe 14 leading to the tower 1 already mentioned. The chamber 30 is further by means of the pipes 32 and 34 connected, via the pump 33, with the upper part of the tower section 26 where the pipe 34 ends in a trickling device 35 arranged in the free space above the filling. For the discharge of the acid from the chamber 30 an overflow pipe 39 is arranged and for the gas escaping from the upper tower section 25 there is a discharge pipe 37 connected with the gas supply pipe 14.

With the use of this apparatus the process according to the invention may be carried out in the following manner.

If it be supposed that at first only the limestone tower is to be set working, the valves 41 and 43 in the gas supply pipes and the valve 46 in the overflow pipe 21 are kept closed, while the valves 42 and 45 are kept open. The $SO_2$ gas is for instance introduced at the bottom of the tower 1 direct from sulphur or pyrite furnaces through the pipes 40 and 14. At the top of the tower the pipe 6 continually supplies a quantity of water regulated in relation to the quantity of acid to be produced and trickled down through the tower. By means of the circulation pump 17 the liquid collected in the chamber 15 is circulated through the lower section 3.

By appropriate regulation of the valves 8, 20 and 42 the absorption and reaction conditions may be regulated in such a way that the $SO_2$ content of the gases may be practically wholly absorbed in the tower, and at the same time a raw acid of definite composition can be obtained. The upper section of the limestone filling serves here especially for the achievement of a complete absorption of the SO₂-content of the diluted gases passing upwards from the lower tower section which are here brought into contact with fresh water and limestone. In the lower tower section on the other hand the dissolution of the lime takes place whereby a solution of the desired lime content is obtained. If namely the valve 20 is kept more or less open, the supply of water and gas being kept constant, the quantity of liquid circulated through the tower section 3 or the rate of circulation and consequently also the quantity of lime dissolved, that is the content of lime in the raw acid, will change correspondingly, said acid being discharged through the overflow pipe 21 and the branch pipe 44 in a quantity corresponding to the supply of water.

The absorption of the SO₂ and the dissolution of the lime is in this way performed in a very effective manner. Said reactions are namely in a high degree promoted by the effective sprinkling of the limestone filling and the circulation in the lower tower section where there is a very big total surface of the limestones, which are continually decreasing in size during their passage downwards. At the same time the circulation prevents the grating from being clogged up. On account of this and also because of the comparatively high sinking rate of the limestone filling in the upper narrow tower section where the consumption of lime is comparatively low also the so-called "hanging" of the limestone filling is prevented.

The efficiency of the process described is, consequently, very high and the tower may, therefore, be comparatively small in size and nevertheless have a great capacity.

If in the acid flowing out from the limestone tower the content of totally free SO₂ is to be increased, said acid is transferred into the tower 24. For this purpose the valve 45 is closed, the valves 41, 43, 46 and 38 are opened and the pumps 22 and 33 started. (For the present it may be assumed that also the valve 42 is closed.)

The raw acid from the limestone tower 1 is then introduced into and trickled down from the top of the tower 24. Here it meets the SO₂ gas supplied from the pipe 31 and passing upwards through the tower where its content of SO₂ is partly absorbed by the acid trickling down. The lime content of the acid being constant, the composition of the acid is thus changed only with regard to its content of free SO₂. Said content of free SO₂ may be varied as desired with regard to the utilization purpose of the acid by appropriate regulation of the quantity of acid circulated through the lower tower section. Like the pump 22 the pump 33 is so dimensioned that it can transfer a quantity of liquid several times as great as that supplied to the top of the tower. The raw acid thus enriched in SO₂ is then discharged from the tower through the overflow pipe 39.

The gas escaping from the top of the tower section 25 which generally still has a rather great content of SO₂ is then through the pipes 37 and 14 transferred to and introduced into the tower 1 where it is utilized in the manner described above. In this case, consequently, it is assumed that the SO₂ gas before being supplied to the tower 1 has been passed through the tower 24.

In such cases, however, where the two towers 24 and 1 are operated simultaneously, the SO₂ gas may also be supplied to the tower 1 partly direct from the pipe 40, partly via the tower 24. In the last-mentioned cases the valve 42 is also kept open and is regulated in the appropriate manner.

The method described renders it possible when using limestone in lumps to produce continually bisulphite solutions of definite composition according to the conditions occurring by means of a very simple and cheap process and without difficulties caused by interruption in working. Further the process may be carried out in a plant which in comparison with the plants of this kind already known and having the same capacity is considerably smaller in size and, consequently, the plant will also entail considerably lower building costs.

The process according to the invention may also include the production of magnesium bisulphite solutions or solutions containing magnesium bisulphite which may be obtained for instance by using dolomite instead of lime.

It should further be pointed out that in the process described such alterations and modifications may be undertaken as do not influence the fundamental principle of the same and which lie within the scope of the invention.

Having now particularly described the nature of my invention and the manner of its operation, what I claim is:

1. A continuous process for the production of bisulphite solutions of the kind used in the manufacture of sulphite pulp, which comprises feeding downwardly a confined mass of a lime containing material in pieces, causing the descending mass to deflect laterally at a point substantially above its lower extremity, spraying water over the mass from the top, passing SO₂ containing gas upwardly through the mass, thereby causing a reaction between the lime containing material, the water and the sulphur dioxide to form a bisulphite solution, collecting the resulting solution from the bottom of the mass, continuously returning solution to the point where the descending mass of lime containing material is deflected laterally and spraying it from above over said laterally deflected lower portion of the mass, and continuously discharging the resulting bisulphite solution from the reaction zone.

2. A continuous process for the production of bisulphite solutions of the kind used in the manufacture of sulphite pulp, which comprises feeding downwardly a confined mass of a lime-bearing material in lump form, causing the descending mass to deflect laterally at a point substantially above its lower extremity, spraying water over the mass from the top, passing SO₂ containing gas upwardly through the mass, thereby causing a reaction between the lime-bearing material, the water and the sulphur dioxide to form a bisulphite solution, collecting the resulting solution from the bottom of the mass, continuously returning solution to the point where the descending mass of lime containing material is deflected laterally and spraying it from above over said laterally deflected lower portion of the mass, the extent of circulation being regulated to ensure a predetermined base content in the resulting solution, continuously discharging the liquor from the reaction zone, and then passing the liquor thus obtained through an absorption tower in countercurrent relationship to $SO_2$-containing gases to increase the content of free $SO_2$ in the solution.

3. A continuous process of producing sulphite acid liquor, which comprises passing $SO_2$ containing gases successively through a confined mass of an insoluble interstitial material and a mass of limestone in pieces, said mass of limestone being fed downwardly within a confined zone and caused to deflect laterally at a point substantially above its lower extremity, spraying water from above over the mass of limestone, thereby causing the water, the limestone and the sulphur dioxide to react with each other to form a calcium bisulphite solution, collecting said bisulphite solution from the bottom of the mass of limestone, continuously circulating the solution through the deflected lower portion of the limestone mass to obtain a solution of predetermined composition, trickling said solution through the mass of insoluble interstitial material in countercurrent relationship to the sulphur dioxide passing upwards therethrough, thereby causing $SO_2$ to be absorbed therein, collecting the resulting solution from the bottom of the mass of interstitial material, continuously circulating solution through the lower portion of said mass of interstitial material, the extent of circulation being regulated to ensure the desired content of free $SO_2$ in the liquor, and then continuously discharging the calcium sulphite acid liquor thus produced.

GUSTAF HAGLUND.